United States Patent [19]

Ishizaki et al.

[11] Patent Number: 5,761,426
[45] Date of Patent: Jun. 2, 1998

[54] METHOD FOR EXECUTING COMMUNICATION BETWEEN PROCESSORS IN PARALLEL COMPUTER

[75] Inventors: Kazuaki Ishizaki, Tokyo-to; Hideaki Komatsu, Yokohama; Takeshi Ogasawara, Tokyo-to, all of Japan

[73] Assignee: International Business Machines Corporation, Armonk, N.Y.

[21] Appl. No.: 700,898

[22] Filed: Aug. 21, 1996

[30] Foreign Application Priority Data

Aug. 24, 1995 [JP] Japan .................... 7-215601

[51] Int. Cl.$^6$ .................... G06F 9/445; G06F 9/24
[52] U.S. Cl. .................... 395/200.51; 395/653
[58] Field of Search .................... 360/137, 69; 395/309, 395/200.56, 200.51, 707, 709, 200.61, 800.22, 653, 500, 77, 800.29, 730, 183.19; 370/422, 397, 255; 364/DIG. 1, DIG. 2; 371/20.1; 340/949; 369/29; 379/93.14, 75, 84

[56] References Cited

U.S. PATENT DOCUMENTS 5,355,492  10/1994  Frankel et al. .................... 395/707
5,509,010  4/1996  LaPorta et al. .................... 370/397
5,530,703  6/1996  Liu et al. .................... 370/255

Primary Examiner—Daniel H. Pan
Attorney, Agent, or Firm—Floyd A. Gonzalez

[57] ABSTRACT

A method for communication between processors in a parallel computer, particularly a method in which a past communication history is used to omit the calculation of the communication pattern between processors, whereby the communication between processors is carried out at high speed. The method performs a communication between processors in a computer having a plurality of processors by the steps of: (a) extracting a plurality of parameters for deciding the communication pattern between processors, (b) preparing a working area for storing the parameters, (c) generating an object code for storing the parameters in the working area, (d) storing the parameters in the working area to memorize a history of the communication pattern or a history of a memory access pattern for performing the reading/writing of data for the communication between processors, (e) comparing the parameters based on the execution of the object code with the parameters stored in the working area when the object code is executed, and (f) executing the communication between processors by reusing the communication pattern or the memory access pattern in response to the result of the comparison.

9 Claims, 3 Drawing Sheets

METHOD FOR EXECUTING COMMUNICATION BETWEEN PROCESSORS IN PARALLEL COMPUTER

DETAILED DESCRIPTION OF THE INVENTION

1. Field of the Invention

The present invention is related to a method for communication between processors in a parallel computer, and particularly to a method for executing communication between processors at high speed by omitting the calculation of a communication pattern between processors, and using a past communication history.

2. Background Art

To execute a program at high speed in a computer having a plurality of processors each having a memory, it is required to distribute data between the processors and partition the calculation for the data between the processors. In this case, for the receiving and sending of data between processors, communication occurs between them. For executing a program at high speed in a multiprocessor system, it is important to speed up the communication.

As a method of such communication between processors, the following conventional technique is known. It is assumed that, when an element vector to access the element of an array X is given, a function giving the processor having the element is $D_x(k)$. Further, it is assumed that, when a loop index vector i is given in a nested loop j, a function giving a processor which executes the calculation of loop index vector i is $C_j(i)$. In addition, it is assumed that, when a loop index vector i is given in a nested loop j, a function deciding an array element x referenced at j is $F_{jx}(i)$. If, at this point, the following expression is valid, no communication occurs between processors; otherwise a communication occurs:

$$D_x(F_{jx}(i)) = C_j(i) \quad \text{(equation 1)}$$

This expression shows that a processor having an element of an array x accessed by an index i is equal to a processor carrying out the calculation of the index i.

If the communication occurs, a communication pattern between processors must be determined for performing a transfer from $D_x(F_{jx}(i))$ to $C_j(i)$.

Hereinafter, to simplify the description of communication in the assignment statement in the program, the function $C_j(i)$ for determining the processor performing the calculation is made to be the same as the distribution of the array on the left hand side of the assignment statement. In this case, to determine whether a communication between processors is needed, it is only needed to examine whether the following expression is valid for the array on the left hand side LHS (Left-Hand-Side) and the array on the right hand side RHS (Right-Hand-Side).

$$D_{LHS}(F_{jLHSx}(i)) = D_{RHSj}(F_{jRHS}(i)) \quad \text{(equation 2)}$$

This expression shown that a processor having an element of an array LHS accessed at an index i is equal to a processor having an element of an array RHS accessed at an index i.

The distribution of an array accessed by the assignment statement is decided by the number of processors onto which the array is distributed, the magnitude of each dimension, and the distribution method. Then, the following vectors are defined:

Vector p: A vector showing the number of processors onto which each dimension of the array is distributed;

Vector n: A vector showing the magnitude of each dimension of the array;

Vector d: A vector showing the method for distributing each dimension of the array; and Vector a: A parameter of an expression for deciding the array reference.

In such definitions, the function $D_x(k)$ for deciding the distribution of the array x is determined by the vector p, vector n, and vector d. Further, the loop index vector is determined by the lower and upper bounds of the loop index. In addition, when a loop index vector i is given for a nested loop j, the function $F_{jx}(i)$ for deciding the array element to be referenced is determined by the vector a.

Accordingly, to determine the communication required for executing a certain assignment statement, the following parameters in the program are necessary:

(1) Lower and upper bounds of a loop index;
(2) Number of processors onto which each dimension of the array on the left hand side is distributed;
(3) Magnitude of each dimension of the array on the left hand side;
(4) Method for distributing each dimension of the array on the left hand side;
(5) Parameter of the expression for deciding the array reference on the left part;
(6) Number of processors onto which each dimension of the array on the right hand side is distributed;
(7) Magnitude of each dimension of the array on the right part
(8) Method for partitioning each dimension of the array on the right hand side; and
(9) Parameter of the expression for deciding the array reference on the right hand side.

We will explain these parameters by taking the following program list 1 as an example. At this point, it should be noted that, in a popular program, it is known that the data communication patterns between processors often have the same portion which is repeatedly executed, though the contents of the arrays to be accessed are different.

Program list 1

```
SUBROUTINE SUB(A,N)
REAL A(N)
!HPF$ PROCESSORS P(4)
!HPF$ DISTRIBUTE (BLOCK) onto P :: A
    DO TIME=1,10
        DO I=2,N-1
            A(I)=A(I-1)+A(I)+A(I+1)
        ENDDO
    ENDDO
END
```

In addition, in this example, the statement "!HPF$ PROCESSORS P(4)" means that four processors are arranged in one dimension, and this processor arrangement is named P. Further, the statement "!HPF$ DISTRIBUTE (BLOCK) onto P :: A" represents the method for distributing the array A, and specifically, it means that the array A is distributed into blocks and onto the processor named P. In addition, "A(I)=(I-1)+A(I)+A(I+1)" is called an assignment statement.

In the program 1, the above described parameters are as follows:

(1) Lower and upper bounds of a loop index: 2,N−1;
(2) Number of processors onto which each dimension of the array on the left hand side is distributed: First dimension 4;
(3) Magnitude of each dimension of the array on the left part: First dimension N;

(4) Method for distributing each dimension of the array on the left hand side: First dimension BLOCK;

(5) Parameter (aI+b) of the expression for deciding the array reference on the left hand side: First dimension a=1, b=0;

(6) Number of processors onto which each dimension of the array on the right hand side is distributed: First dimension 4;

(7) Magnitude of each dimension of the array on the right hand side: First dimension N;

(8) Method for distributing each dimension of the array on the right hand side: First dimension BLOCK; and (9) Parameter (aI+b) of the expression for deciding the array reference on the right hand side:
First dimension a=1,b=−1
First dimension a=1,b=0
First dimension a=1,b=1.

In the conventional method, each time the nested loop of DO I is executed, a communication pattern is repeatedly calculated, and data is sent to the destination processor according to the calculated communication pattern. Thus, time is required to calculate a communication pattern and carry out a communication between processors each time the communication occurs.

As described above, in the conventional method, the need for calculation of a communication pattern occurs each time it is needed for the sending/receiving of data between processors. The time taken for calculating the communication pattern has been the overhead in communication. Thus, it is the object of the present invention to speed up the communication between processors.

SUMMARY OF THE INVENTION

In the above program list 1, the above-mentioned parameters are not changed each time the nested loop of DO I is executed. If the communication pattern for the execution of the nested loop is once calculated in the case of TIME=1, data can be sent by reusing the already calculated communication pattern for the subsequent cycles of TIME=2 ... 10 without further calculating the communication pattern, and thus the calculation of the communication pattern between processors can be omitted.

Accordingly, the present invention provides, in a method for executing communication between processors in a computer having a plurality of processors, a method comprising the steps of:

(a) extracting a plurality of parameters for deciding a communication pattern between processors;

(b) preparing a working area for storing the parameters;

(c) generating an object code for storing the parameters in the working area;

(d) storing the parameters in the working area to memorize a history of the communication pattern or a history of a memory access pattern for performing the data writing and reading for the communication between processors;

(e) comparing the parameters based on the execution of the object code with the parameters stored in the working area when the object code is executed; and (f) executing the communication between processors by reusing the communication pattern or the memory access pattern through the use of the parameters stored in the working area, in response to the result of the comparison.

In the step (a), the extraction may be carried out by checking whether the respective parameters vary in value during the execution of a next loop or they are constants, thereby determining whether the communication pattern can be cached.

Further, in step (e), the parameters based on the execution of the object code may be compared with the parameters for the communication pattern which are stored in the working area, thereby determining whether they are identical.

Step (e) may be such that the parameters based on the execution of the object code is compared with the parameters for the communication pattern which are stored in the working area, thereby determining whether they are identical, and if identical, then a further comparison with the parameters for the memory access pattern is carried out determining whether they are identical.

The parameters extracted in step (a) may have values in the parameters for a loop in the program such as the number of processors onto which the arrays on the left and right hand side in an assignment statement in the loop are distributed, the magnitude of each dimension of the arrays, the method for distributing each dimension of the arrays, and the expression for deciding the array reference.

Further, the above communication pattern may be one which describes an area for sending and receiving data between one processor and another processor.

Moreover, the above memory access pattern may be the one which describes a memory area which is managed by a certain processor when data is sent or received according to the communication pattern.

DESCRIPTION OF THE PREFERRED EMBODIMENT

Figure 1:
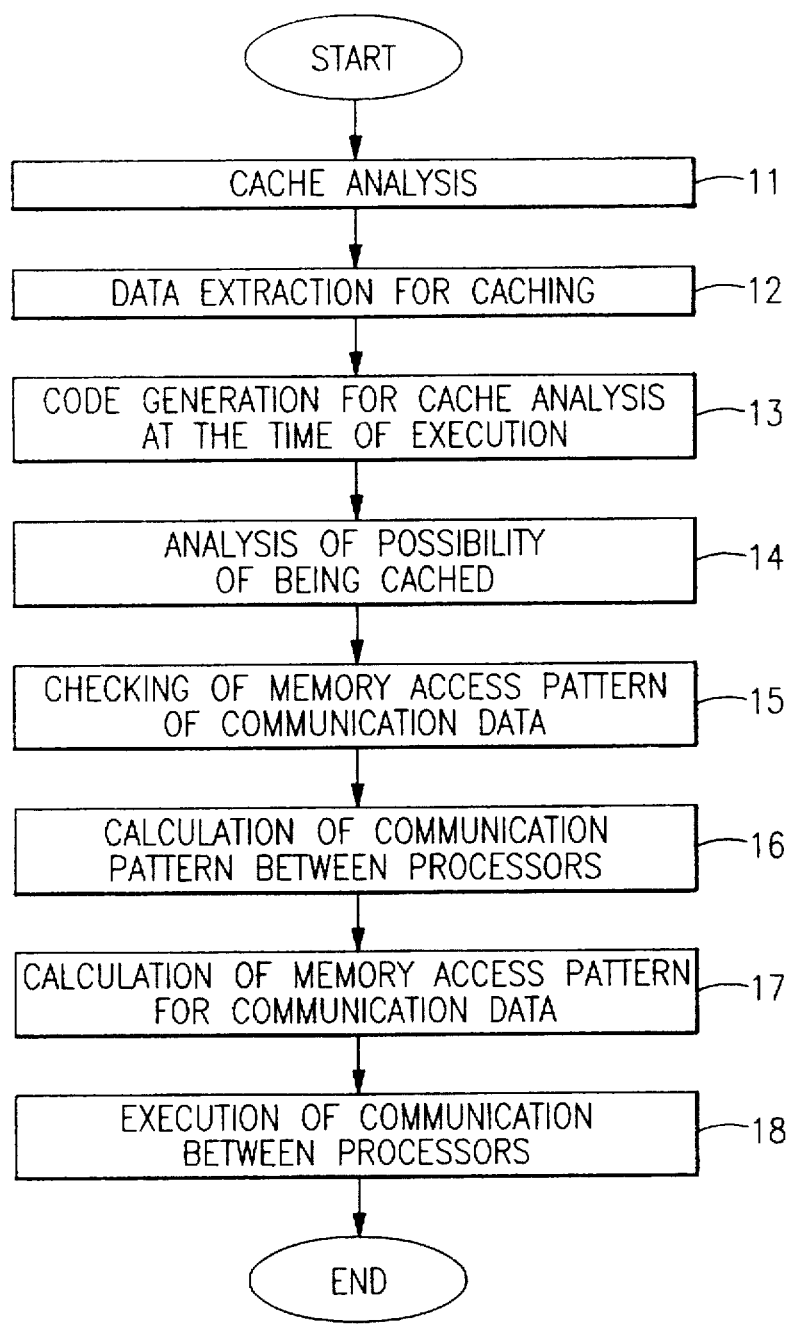
FIG. 1 is a flowchart showing an embodiment of the invention.

FIG. 1 is a flowchart showing an embodiment of the present invention. This flowchart is comprised of an analysis by a complier, a code generation (step 11 to step 13), the analysis by an object code and storing of communication pattern (step 14 to step 18).

Cache analysis (step 11)

First, an analysis is carried out to determine whether the communication pattern generated in the execution of an assignment statement in the target nested loop can be cached, that is, the past history can be used. For that, the following parameters need to be examined:

(1) Lower and upper bounds of a loop index;

(2) Number of processors onto which each dimension of the array on the left hand side is distributed;

(3) Magnitude of each dimension of the array on the left hand side;

(4) Method for distributing each dimension of the array on the left hand side;

(5) Parameter of the expression for deciding the array reference on the left hand side;

(6) Number of processors onto which each dimension of the array on the right hand side is distributed;

(7) Magnitude of each dimension of the array on the right hand side;

(8) Method for distributing each dimension of the array on the right hand side; and (9) Parameter of the expression for deciding the array reference on the right hand side.

In order that the communication pattern can be cached, these parameters need to satisfy the following conditions.

Condition 1

The respective parameters should be constants or variables the value of which does not vary within a loop during the execution of a nested loop.

If this condition is satisfied, it is determined that the communication pattern can be cached, and the process goes to the next step.

Data extraction for caching (step 12)

With respect to the above parameters, parameters which may vary in the execution of the object code are checked. Then, a working area is provided for storing a history of the communication pattern and a history of the memory access pattern, and when a compilation is carried out, areas for the old and the current parameters are reserved in the working area for the number of parameters which may vary.

Figure 2:
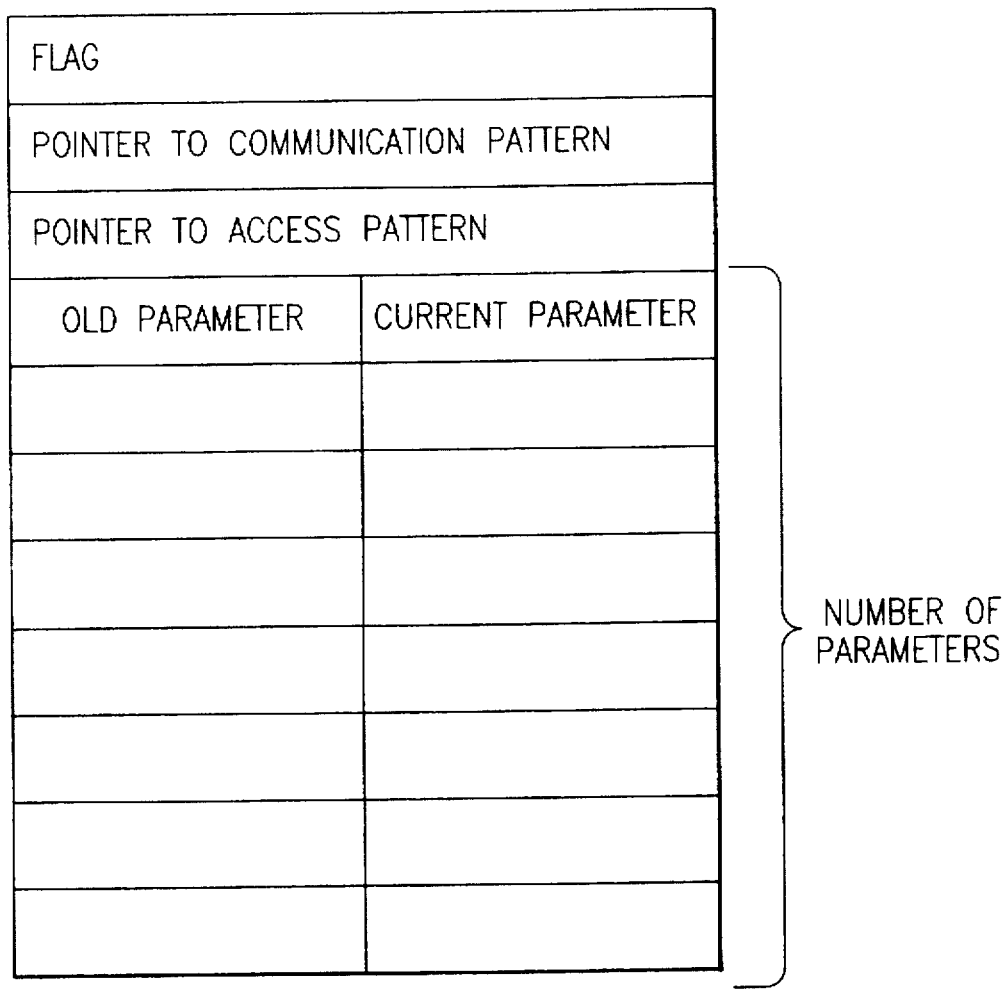
FIG. 2 is a figure showing the working area in the embodiment.

FIG. 2 shows the working area in this embodiment. In the "flag" in FIG. 2, 1 is set if the value of the old parameter is valid, and 0 is set if it is invalid. Further, 0 is preset to reserve an area. The "pointer to communication pattern" indicates a pointer as a result of calculating array areas for all the processors, in each of which it is possible to collectively send data from the respective local processor. The "pointer to access patterns" indicates a pointer to the base address read out from the local processor, the stride, and the number of elements when data is sent according to the communication pattern between processors. In addition, in the "old parameter," the value of the parameter when the communication pattern was calculated in the last run is indicated, and in the "current parameter," the value of the current parameter is indicated.

For parameters which may vary at the time of execution, a code to be stored in the current parameter of the above working area is generated. However, even for a parameter which may vary at the time of execution, a code for storing the parameter in the working area is not generated if the following two conditions are satisfied:

Condition 2

(1) No loop index appears in the expression for accessing a certain dimension of an array; and (2) The number of processors onto which a certain dimension of an array is distributed is one, or it is distributed to no processor.

That is, attention is paid to the point that, even if the values of the parameters for calculating the communication pattern between processors are different, only the memory access patterns in the processors are different, but the communication patterns between the processors are the same. Accordingly, if such conditions are satisfied, the calculation of the communication pattern can be omitted.

In addition, the all parameters related to the dimensions of an array are not stored in the working area as parameters which are analyzed for the possibility of being cached. However, the parameters are used in each processor at the time of execution as parameters for deciding a memory address for reading/writing data performing the communication between processors.

By the above steps 12 and 13 of FIG. 1, a plurality of parameters for deciding the communication pattern between processors are extracted.

We will now return to FIG. 1.

Code generation for cache analysis at the time of execution (step 13)

A subroutine call is generated for performing the process in the next step.

Analysis of possibility of being cached (step 14)

The following description is made to the processing of the library in the subroutine call generated in step 13. The following description is predicated on that, at a time when the library is executed, the latest value is held in the current parameter of the working area reserved at the time of compilation. First, a check is made as to whether the communication parameter used in the last run can be utilized (step 14). That is, it is examined whether the current parameter in the working area is identical with the old parameter. This step is described later.

Checking of memory access pattern of communication data (step 15)

A check is made as to whether the access pattern for the reading from or writing to a memory of data transferred according to the communication pattern between processors is identical with the cached data. If the check in step 15 of condition 2 described in step 12 indicates that memory access pattern does not change, the process goes to step 18. If there is any parameter which does not satisfy the condition 2, the memory access pattern may be different even for the same communication pattern, and thus the process goes to step 17 to calculate the memory access pattern. Since the calculation of the memory access pattern in step 17 has a shorter overhead as compared with the calculation of the communication pattern between processors in the next step 16, the effect of the cache is significant even if a recalculation is executed.

Calculation of communication pattern between processors (step 16)

There are the following two cases in which the communication pattern between processors is calculated:

(1) The communication pattern between processors is calculated for the first time; and (2) The parameter used in the calculation of the previous communication pattern between processors is not equal to the current parameter.

The value of the current parameter in the working area is used to calculate the communication pattern between processors. The communication pattern is a result of determining for the all processors an array area to which data can be collectively sent from the local processor.

The calculation of the communication pattern is carried out by the following procedure:

(1) From the distribution of the array on the left hand side of the assignment statement, calculate the index range of the loop which the local processor executes;

(2) For the array on the right hand side, an area into which the array is read is calculated by the loop index range calculated in (1); and (3) The difference between the area into which the array is read, which was calculated in (2), and the area actually possessed by the local processor becomes the communication pattern between processors.

In addition, the pointer to the communication pattern between processors is stored in the working area reserved at the time of compilation.

Calculation of memory access pattern for communication data (step 17)

An access pattern is decided for performing the reading or writing to a memory of data to be transferred according to the communication pattern between processors. The memory access pattern means a base address, stride, and number of elements, which are read from the memory of the local processor when data is sent according to the communication pattern between processors. Or, it also means a base address, stride, and number of elements, which are written to the memory of the local processor when data is received according to the communication pattern between processors. In addition, the pointer to the calculated memory access pattern is stored in the working area reserved at the time of compilation.

Execution of communication between processors (step 18)

An actual communication between processors is carried out according to the communication pattern between processors and the memory access pattern which are cached or recalculated.

Figure 3:
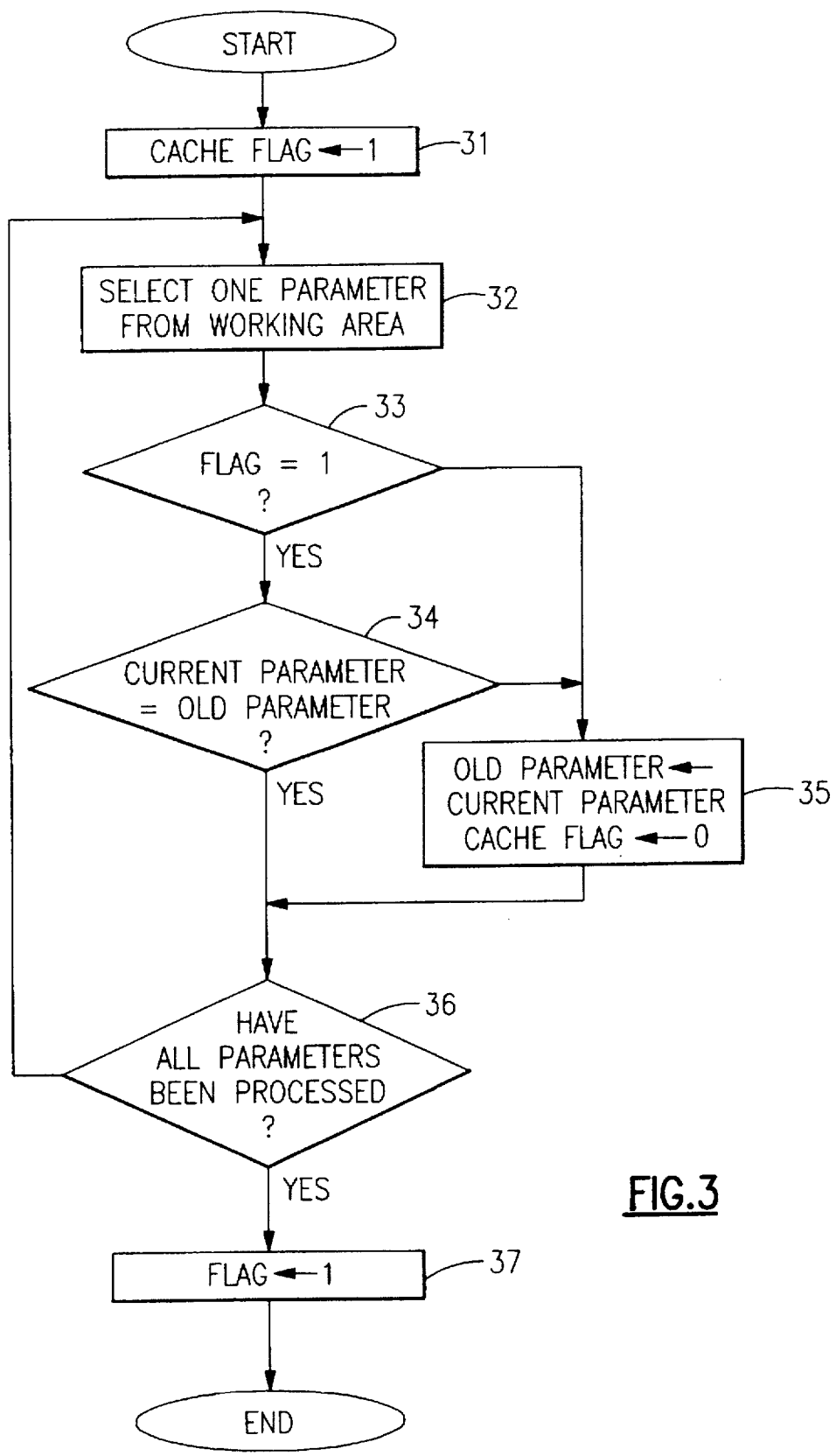
FIG. 3 is a flowchart detailing the analysis of the possibility of being cached.

Now, the analysis of possibility of being cached in step 14 is further detailed. This step is to check whether the current parameter in the working area is identical with the old parameter, and it is determined by the execution of the flow as shown in FIG. 3 and the state of a cache flag.

First, 1 is set in the cache flag (step 31), and one parameter is selected from the working area (step 32). Then, it is determined whether the flag is 1, that is, whether the old parameter is valid (step 33). If the flag is 1, that is, if the old parameter is valid, it is determined whether the current parameter is identical with the old parameter (step 34). If the flag is not 1 in step 33, or if the current parameter and the old parameter are not identical in step 34, then the process goes to step 35 where 0 is set in the cache flag and the current parameter is assigned to the old parameter. If step 34 is Yes, or after the processing of step 35, it is determined whether the all parameters have been processed (step 36). If the answer is Yes, the process is ended after setting 1 in the flag (step 37). If the answer is No, the process returns to step 32.

If the cache flag remains to be 1 when the process is completed, the same communication pattern between processors as that used in the last run can be used. In this case, the process goes to step 15. Further, if the cache flag is 0, the process goes to step 16 because it is required to recalculate the communication pattern between processors.

If the previously calculated communication pattern is repeated by the above procedure, the recalculation of the communication pattern between processors can be omitted. The present invention is now described by taking an actual program as an example.

Method for omitting calculation of communication pattern between processors

The following program list 2 is an example of the difference method, and it is executed by four processors onto which an array A is distributed.

Program list 2

```
SUBROUTINE SUB(A,N)
    REAL A(N)
!HPF$ PROCESSORS P(4)
!HPF$ DISTRIBUTE (BLOCK) onto P :: A
    DO TIME=1,10
        DO I=2,N-1
            A(I)=A(I-1)+A(I)+A(I+1)
        ENDDO
    ENDDO
END
```

If the present invention is applied to compile this program, the following code is generated.

```
SUBROUTINE SUB(A,N)
    REAL A(N)
    DO TIME=1,10
        w0.array_ub(1)=N
        w0.loop ub(1)=N-1
        call Compute_LIS(A(I), LIS, w0)
        w1.array_ub(1)=N
        call Do_Prefetch_Comm(LIS, A(I+1), w1)
        w2.array_ub(1)=N
        call Do_Pipeline_Recv(LIS, A(I-1), w2)
        Do I=LIS.LB(1),LIS.UB(1)
            A(I) =A(I-1)+A(I)+A(I+1)
        ENDDO
        w3.array_ub(1)=N
        call Do_Pipeline_Send(LIS, A(I-1), w2)
    ENDDO
```

Although the following description is related to the behavior of the processor No. 1 on the assumption that N=100, the same thing can be said with the processors No. 2 to No. 4. First, consider the case when TIME=1. The loop index range I allocated to the processor 1 is calculated by Compute_LIS. In this case, of the above described parameters (1) to (9), parameters (1) to (5) are needed as follows:

(1) Lower and upper bounds of a loop index: 2,N−1;
(2) Number of processors onto which each dimension of the array on the left hand side is distributed: First dimension 4;
(3) Magnitude of each dimension of the array on the left hand side: First dimension N;
(4) Method for distributing each dimension of the array on the left hand side: First dimension BLOCK; and
(5) Parameter (aI+b) of the expression for deciding the array reference on the left part: First dimension a=1, b=0.

Since the parameters which may vary at the time of execution are the magnitude N of the array and the upper bound N−1 of the loop index, these two are stored in the current parameter of the working area w0, and Compute_LIS is called. Since the flag in the working area is 0 when it is called for the first time, the flag is set to 1 and the current parameter is copied to the old parameter area, and thereafter the index range is calculated. The index range allocated to the processor 1 is calculated from these parameters, and represented by the triplet form of Fortran 90, [2:25:1].

Calculation of the communication pattern between processors requires the index range and the parameters (6) to (9) of the above described parameters (1) to (9) are as follows:

(6) Number of processors onto which each dimension of the array on the right hand side is distributed: First dimension 4;
(7) Magnitude of each dimension of the array on the right hand side: First dimension N;
(8) Method for distributing each dimension of the array on the right hand side: First dimension BLOCK; and
(9) Parameter (aI+b) of the expression for deciding the array reference on the right hand side:
    First dimension a=1,b=−1
    First dimension a=1,b=0
    First dimension a=1,b=1.

Since the parameter which may vary at the time of execution is the magnitude of the array N, this is stored in the current parameter of the working areas w1, w2, and w3 which were reserved at the time of compilation, and a library for communication calculation is called. Since there are three arrays appearing on the right hand side of the assignment statement in this loop, the following result is obtained by calculating the communication pattern between processors for the array reference on the each right hand side from these parameters.

For the communication for A(I−1), [25:25:1] is sent to the processor 2 after the execution of the loop.

For A(I), no communication is required because the access is the same as the left hand side.

For the communication for A(I+1), [26:26:1] is received from the processor 2 before the execution of the loop.

Accordingly, the parameter related to A(I+1) is stored in the working area w1, and the sending and receiving of data is performed just before the execution of the loop. Further, the parameter related to A(I−1) is stored in the working areas w2 and w3, and data is received just before the execution of the loop and sent just after the execution of the loop.

Now, consideration is given to the case in which TIME=2. Also in the case of TIME=2, N=100 as in the case of TIME=1. First, the index range is calculated by Compute__LIS. Compute__LIS is called after the magnitude of array N and the upper bound N−1 of the loop index are stored in the current parameter of the working area w0. This time, since the flag in the working area is 1, the old parameter for TIME=1 and the current parameter of this time are compared. As a result, the all parameters are equal, and thus the loop index [2:25:1] used for TIME=1 is reused.

Thereafter, the communication between processors is calculated. First, the communication for A(I+1) is considered. Do__Prefetch__Comm is called after the magnitude of array N is stored in the current parameter of the working area w1. This time, since the flag in the working area is 1, the old parameter for TIME=1 and the current parameter of this time are compared. As a result, the all parameters are equal, the communication pattern of receiving [26:26:1] from the processor 2 just before the execution of the loop, which was used for TIME=1, is reused. Since the communication pattern for TIME=1 can be reused for the succeeding TIME=3 to TIME=10, it is possible to minimize the overhead in the communication and accomplish a fast communication between processors.

Method in which only the memory access pattern in the processor is different and the calculation of the communication pattern is omitted The following program 3 is an example of the difference method. It is executed by four processors onto which the first dimension of the array A is distributed. The second dimension of the array A is not distributed.

Program list 3

```
SUBROUTINE SUB(A,N)
REAL A(N, 2)
!HPF$ PROCESSORS P(4)
!HPF$ DISTRIBUTE (BLOCK, *) onto P :: A
K=1
DO TIME=1,10
    DO I=2,N−1
        A(I,3−K) = A(I−1,K)+A(I,K)+A(I+1,K)
    ENDDO.
    k=3−k
ENDDO
END
```

If the present invention is applied to compile this program, the following code is generated:

```
SUBROUTINE SUB(A,N)
REAL A(N)
K=1
DO TIME=1,10
    w0.array__ub(1)=N
    w0.loop__ub(1)=N−1
```

-continued

```
    call Compute__LIS(A(I), LIS, w0)
    w1.array__ub(1)=N
    call Do__Prefetch__Comm(LIS, A(I+1), w1, K)
    w2.array__ub(1)=N
    call Do__Pipeline__Recv(LIS, A(I−1), w2, K)
    DO I=LIS.LB(1),LIS.UB(1)
        A(I,K)=A(I−1,K)+A(I,K)+A(I+1,K)
    ENDDO
    w3.array__ub(1)=N
    call Do__Pipeline__Send(LIS, A(I−1), w3, K)
    K=3−K
ENDDO
```

Although the following description is made to the behavior of the processor No. 1 on the assumption that N=100, it is also applicable to the processors No. 2 to No. 4. First, consideration is given to the case of TIME=1. By COMPUTE__LIS, the range of the loop index I is calculated in which the processor No. 1 performs the calculation. For this, of the parameters (1) to (9), parameters (1) to (5) are required as follows:

(1) Lower and upper bounds of the loop index: 2,N−1;
(2) Number of processors onto which each dimension of the array on the left hand side is distributed:
First dimension 4
Second dimension 0;
(3) Magnitude of each dimension of the array on the left hand side:
First dimension N
Second dimension N;
(4) Method for distributing each dimension of the array on the left hand side:
First dimension BLOCK
Second dimension *; and
(5) Parameter (aI+b) of the expression for deciding the array reference on the left hand side:
First dimension a=1,b=0
Second dimension a=0,b=k.

Since the parameters which have an effect on the determination of the loop index and may vary at the time of execution are the magnitude N of the first dimension and the upper bound N−1 of the loop index, these two are stored in the current parameter of the working area w0 reserved at the time of compilation, and Compute__LIS is called.

If it is called for the first time, the flag in the working area is 0, and thus, after the flag is set to 1 and the current parameter is copied to the old parameter area, the index range is calculated. From these parameters, the index range assigned to the processor 1 is calculated and represented in the triplet form of Fortran 90, [2:25:1].

Calculation of the communication pattern between processors requires the index range and the parameters (6) to (9) of the above described parameters (1) to (9) are as follows:

(6) Number of processors onto which each dimension of the array on the right hand side is distributed:
First dimension 4
Second dimension 0;
(7) Magnitude of each dimension of the array on the right hand side:
First dimension N
Second dimension N;
(8) Method for distributing each dimension of the array on the right hand side:
First dimension BLOCK
Second dimension *; and
(9) Parameter (aI+b) of the expression for deciding the array reference on the right hand side:

First dimension a=1,b=-1
Second dimension a=0,b=K
First dimension a=1,b=0
Second dimension a=0, b=K
First dimension a=1,b=1
Second dimension a=0,b=K.

Since the parameter having an effect on the communication pattern between processors is only the parameter of the first dimension for which the array is distributed by BLOCK, and the parameter which may vary at the time of execution is only the magnitude of array N, these are stored in the current parameter of the working areas w1 and w2 reserved at the time of compilation. Further, for the variable K which is not the loop index of the array reference expression and appears in the dimension for which the array is not distributed, the parameters are passed to the run-time library to calculate the memory access pattern, and the library for communication calculation is called. Since there are three arrays which appear on the right hand side of the assignment statement in this loop, calculation is performed for each.

From the parameters stored in the working areas, the communication pattern between processors is calculated for the array reference on each right hand side to obtain the following result:

For the communication related to A(I−1,K), [25:25:1] is sent to the processor 2 after the execution of the loop;

For A(I,K), no communication is required since the access is the same as the left hand side; and For the communication related to A(I+1,K), [26:26:1] is received from the processor 2 before the execution of the loop.

Accordingly, the parameter related to A(I+1) is stored in the working area w1, and the sending and receiving of data is carried out right before the execution of the loop. Further, the parameter related to A(I−1) is stored in the working areas w2 and w3, and data is received just before the execution of the loop and sent just after the execution of the loop.

Consideration is now given to the case of TIME=2. Also in for TIME=2, N=100 is applied as in the case of TIME=1. However, K=2. First, the range of the loop index is calculated by Compute__LIS. Compute__LIS is called after the magnitude of array N and the upper bound N−1 of the loop index are stored in the current parameter of the working area w0. This time, since the flag in the working area is 1, the old parameter for TIME=1 is compared with the current parameter of this time. As a result, the all parameters are equal, and thus the loop index [2:25:1] used for TIME=1 is reused.

Thereafter, the communication pattern between processors is calculated. First, the communication related to A(I+1) is taken up. Do__Prefetch__Comm is called after the magnitude of array N is stored in the current parameter of the working area w1. This time, since the flag in the working area is 1, the old parameter for TIME=1 is compared with the current parameter of this time. As a result, the all parameters are equal, and thus the communication pattern of receiving [26:26:1] from the processor 2 just after the execution of the loop, which was used for TIME=1, is reused. Also for the communication related to A(I−1), the communication pattern of sending [25:25:1] to the processor 2 just after the execution of the loop is reused. However, for the memory access pattern, it is recalculated because it may be different from the last run.

If the calculation is performed using the parameter K, the following result is obtained because K=2:

For A(I−1), [25:25:1][2] is read as communication data; and

For A(I+1), received data is written into [26:26:1][2].

For the succeeding TIME=3 to TIME=10, it is only needed to reuse the communication pattern for TIME=1 and recalculate the memory access pattern, so that the overhead in communication can be minimized and a fast communication between processors is accomplished.

In the conventional distributed memory type parallel computer, a past communication history can be used to omit the calculation of the communication pattern between processors, so that the communication between processors can speed up.

What is claimed is:

1. A method for executing communication between processors in a computer having a plurality of processors, said method comprising the steps of:

(a) extracting a plurality of parameters for deciding a communication pattern between processors;

(b) preparing a working area for storing said parameters;

(c) generating an object code for storing said parameters in said working area;

(d) storing said parameters in said working area, said parameters stored in said working area memorizing at least one of a history of a communication pattern and a history of a memory access pattern for performing data writing and reading for the communication between processors;

(e) comparing said extracted parameters based on the execution of said object code with said parameters stored in said working area when said object code is executed; and (f) executing the communication between processors by reusing said communication pattern or said memory access pattern in response to the result of the comparison.

2. A method as set forth in claim 1 wherein the extraction of said parameters in said step (a) includes checking whether the value changes during the execution of a constant or a nested loop, and determining whether said communication pattern can be cached.

3. A method as set forth in claim 2 wherein said parameters extracted in said step (a) includes extracting: a parameter related to a loop in a program, the number of processors onto which the arrays on the left and right parts in an assignment statement in the loop, the magnitude of each dimension of the arrays, the method for distributing each dimension of the arrays, and parameters in the expression for determining the reference of the arrays.

4. A method as set forth in claim 1 wherein said step (e) includes making a comparison to determine whether patterns of said extracted parameters based on the execution of said object code is identical with the related communication pattern of said parameters stored in said working area.

5. A method as set forth in claim 1 wherein said step (e) includes making a comparison to determine whether patterns of said extracted parameters based on the execution of said object code is identical with the related communications pattern of said parameters stored in said working area, and if identical, makes a further comparison to determine whether patterns of said extracted parameters are identical with the related memory access pattern of said parameters stored in said working area.

6. A method as set forth in claim 1 wherein said parameters extracted in said step (a) includes extracting: a parameter related to a loop in a program, the number of processors onto which the arrays on the left and right parts in an assignment statement in the loop, the magnitude of each dimension of the arrays, the method for distributing each dimension of the arrays, and parameters in the expression for determining the reference of the arrays.

7. A method as set forth in claim 1 wherein said communication pattern includes describing an area for communicating data between one processor and another processor.

8. A method as set forth in claim 1 wherein said memory access pattern includes describing a memory area managed by one processor when data is communicated according to said communication pattern.

9. A method as set forth in claim 1 wherein said step (f) includes using said parameters stored in said working area.

* * * * *